United States Patent
Jouppi

[15] 3,672,413
[45] June 27, 1972

[54] DEVICE FOR DELIMBING TREES
[72] Inventor: Eino J. Jouppi, Isabella, Minn. 55607
[22] Filed: Nov. 23, 1970
[21] Appl. No.: 91,875

Related U.S. Application Data

[63] Continuation-in-part of Ser. No. 3,941, Jan. 19, 1970, abandoned.

[52] U.S. Cl. ............................................. 144/2 Z
[51] Int. Cl. ............................................. A01g 23/02
[58] Field of Search ............... 144/2 Z, 3 D, 34 E, 309 AC

[56] References Cited

UNITED STATES PATENTS

3,572,410  3/1971  McElderry ........................... 144/3 D

Primary Examiner—Gerald A. Dost
Attorney—Wicks and Nemer

[57] ABSTRACT

A device for delimbing felled trees with which a tree is drawn through the device and a blade cradle for supporting the trunk of the tree and for cutting off the branches on substantially the lower or underhalf of the tree as the tree progresses through the device, together with a similar blade cradle mounted on a swinging arm which when lowered causes the blades to engage the upper half of the tree and cut off the limbs, the tree being drawn by a tractor and the swinging arm being lowered by mechanism actuated by the movement of the tree.

23 Claims, 15 Drawing Figures

3,672,413

DEVICE FOR DELIMBING TREES

This is a continuation-in-part of U.S. application Ser. No. 3,941 filed Jan. 19, 1970 and now abandoned by the same inventor.

SUMMARY OF THE INVENTION

The invention relates to an improvement in a device for delimbing a felled tree which includes a frame having a lower blade cradle and an arm having an upper blade cradle carried thereby together with means for causing the arm to pivot downwardly and place the upper blade cradle upon a tree adjacent the lower blade in which the tree is positioned whereby the tree is delimbed when pulled through the blade cradles. The device provides an economical tree delimbing device, for the power means for moving the tree through the device is a tractor or the like which can be used for many endeavors in addition to the delimbing of trees.

In the drawings forming part of this application:

FIG. 3 is a view on the line 3—3 of FIG. 2.

FIG. 12 is a sectional view on the line 12—12 of FIG. 9.

Referring to the drawings in detail, the tree delimbing device A includes an elongated frame including the transverse spaced frame members 14 and 16 with the spaced longitudinal track and frame members 18 and 20 secured at right angles thereto on top of the members 14 and 16. The transverse members 14 and 16 are connected at one end by the end frame member 15 and are mounted upon the channel members 22 and 24 which underlie the tracks 18 and 20, respectively. Further provided is the pivoted arm 26 which includes the first arm portion 28 pivotally connected at its lower end to the upstanding lug 30 by means of the pin 32, the lug 30 mounted on the transverse frame member 16. The swing arm 26 also includes the second arm portion 34 connected at its outer end to the first arm portion 28 with the inner end pivotally connected to the lug 34 of the transverse frame 16 by means of the pin 36.

Secured to the outer end of the first arm portion 28 is the right angular member 38, and also secured to the arm portion 28 and the arm 34 where it joins arm 28 is the right angular member 40 which is parallelly disposed to the member 38.

UPPER FLEXIBLE BLADE CRADLE

The numberal 42 designates a delimbing means in the form of the upper blade cradle for engaging the tree including a multiplicity of flat pivotally connected blades 44, 46, 48, 50, 52, and 54 each of blades 44, 46, and 48 having an oblique bevelled cutting edge 56 and each of blades 50, 52, and 54 having an oblique cutting edge 58 oppositely disposed to the oblique edges 56.

With the oblique cutting edges oppositely disposed, the cutting action of the blades drives the tree into the blade cradles whereby the blades are caused to maintain closer and continuous contact with the tree and cut the limbs off close to the trunk and at right angles to the trunk.

The blade 44 is bolted by bolts 59 to the plate 60, the plate 60 being welded to the blade. The plate 60 is welded to the cross bars 62 and 64. The ends of the cross bars 62 and 64 extend outwardly of the side edges of the blade and are formed with holes to freely receive the pivot pins 66 and 68. The pin 66 pivotally engages the pair of spaced lugs 70 formed on the outer end of the member 38 of the arm 26. The pin 68 pivotally engages holes formed in the outer ends of cross bars 72 and 74 welded to the plate 76 which is secured to the blade 46 by bolts 78. A pivot pin 80 extends through holes in the inner ends of bars 72 and 74 and holes in the outer ends of bars 82 and 84. Bars 82 and 84 are welded to plate 86 which in turn is bolted by bolts 88 to blade 48. The inner ends of bars 82 and 84 are pivotally connected to the inner ends of bars 90 and 92 by pin 94. Bars 90 and 92 are welded to plate 96 which in turn is bolted by bolts 98 to blade 50. The outer ends of bars 90 and 92 are pivotally connected to the innver ends of bars 100 and 102 by pin 104. Bars 100 and 102 are welded to plate 106 which in turn is bolted by bolts 108 to blade 52. The outer ends of bars 100 and 102 are pivotally connected to the inner ends of bars 110 and 112 by means of pin 114. Bars 110 and 112 are welded to plate 1106 which in turn is bolted by bolts 118 to blade 54. The outer ends of bars 110 and 114 are pivotally connected to the pair of spaced lugs 120 of member 40 of arm 26 by means of pin 122.

The upper flexible blade cradle 42 is held in somewhat of a U-shaped log-receiving formation by the restraining chain 124 connected to the outer end of the first arm 28 and the bar 74 mounting blade 46.

LOWER FLEXIBLE BLADE CRADLE

The numeral 126 designates a lower delimbing means for engaging a tree complementary to upper delimbing means 42 in the form of a lower blade cradle. The blade cradle 126 is identical to blade cradle 42 except that in the case of the blades of lower cradle 126 the flat unbevelled face portion of the blades faces generally upwardly while in the case of the blades of upper cradle 42 the flat unbevelled face portion of the blades faces generally downwardly so that in each case the blades tend to be directed during cutting action toward the bark of the tree being delimbed whereby the limbs will be continuously cut as close as possible to the bark or trunk of the tree as the tree is passed through the delimber blades.

Further provided is a first support 128 for the lower blade cradle 126 which includes a substantially flat body 130 pivotally connected at its lower end by means of pin 131 to a pair of upstanding lugs 132 mounted on a bar 134 secured to the top of the transverse frame member 14 and at a right angle to member 14. The upper end of first support 128 is pivotally connected to a pin 136 which is the same as pin 66 of cradle 42 except that it is longer so that it extends through the pair of ears 138 formed on the upper end of the cradle support 128. A stop 140 is mounted on the transverse frame member 14 which limits the pivotal movement of the support in the direction of track 18 and thus the open receiving capacity of the cradle 126, FIG. 3, support 128 shown in broken lines. The pivotal movement of the support 128 in the opposite direction is controlled by the pin 142 secured to the stop 140 and extending through the hole 144 formed in the support 128, the head 146 on the pin 142 engaging the support, particularly FIG. 3 in broken lines.

Also provided is the second support 148 for the other end of the lower blade cradle 126 which is substantially identical to support 128. Support 148 includes a substantially flat body 150 pivotally connected at its lower end by means of pin 152 to a pair of upstanding lugs 154 mounted on bar 156 secured to the top of the transverse frame member 14 and at a right angle to member 14. The upper end of second support 148 is pivotally connected to a pin 158 which is the same as pin 122 except that it is longer so that it extends through the pair of ears 160 formed on the upper end of the cradle support 148. A stop 162 is mounted on the transverse frame member 14 which limits the pivotal movement of the support in the direction of track 20 and together with support 128 the open receiving capacity of the cradle 126, FIG. 3, support 148 shown in broken lines. The pivotal movement of the support 148 in the opposite direction to the broken line position of FIG. 3, is controlled by the pin 164 secured to the stop 162 and extending through the hole 166 formed in the support 148, the head 168 on the pin 164 engaging the support, particularly FIG. 3. Thus a log with a larger diameter deposited on the cradle 126 is accommodated and held in the cradle by the supports 128 and 148 spreading towards the outer positions shown in broken lines, FIG. 3.

It will be seen that with a tree larger in diameter than that shown in FIG. 3, the supports 128 and 148 are automatically pivoted outwardly and with a smaller tree the supports are automatically pivoted inwardly due to the cradling action of the cradle 126. Also, and of primary importance here, as a tree is drawn through the cradles 42 and 126 from the large end to the small end of the tree, the blade cradles automatically come together and cradle the tree closer on the ever reducing diameter of the tree due to the cradling action. Put another way, the reducing diameter of the tree causes the tree to cradle deeper in cradle 126 and still be encompassed substantially by the blades thereof on at least half of the diameter of the tree. Also with the reducing diameter the upper blade cradle 42 falls about the tree as a result of gravity and continues to encompass at least one half of the diameter of the tree whatever the diameter. It will be seen that with a tree in and upon the lower cradle and the upper cradle upon the tree, the tree is substantially encompassed with delimbing blades.

It will also be seen that in tree-engaging position the blade cradles 42 and 126 are offset one from the other so that a felled tree may be drawn through both cradles.

MECHANISM FOR RAISING AND LOWERING THE PIVOTAL FRAME

Further included in the device A is the extension 172 connected to and extending from the channel 22 and pivotally mounted on the extension 172 by means of pin 174 is the bar 176. The outer end of the bar 176 is connected to the cable 178 by clevis 180. The cable 178 is passed over the sheave 182 mounted on the pin 184, said pin mounted on the bracket 186 connected to mast 188 and the bracket 190 connected to frame member 15.

Figure 4:
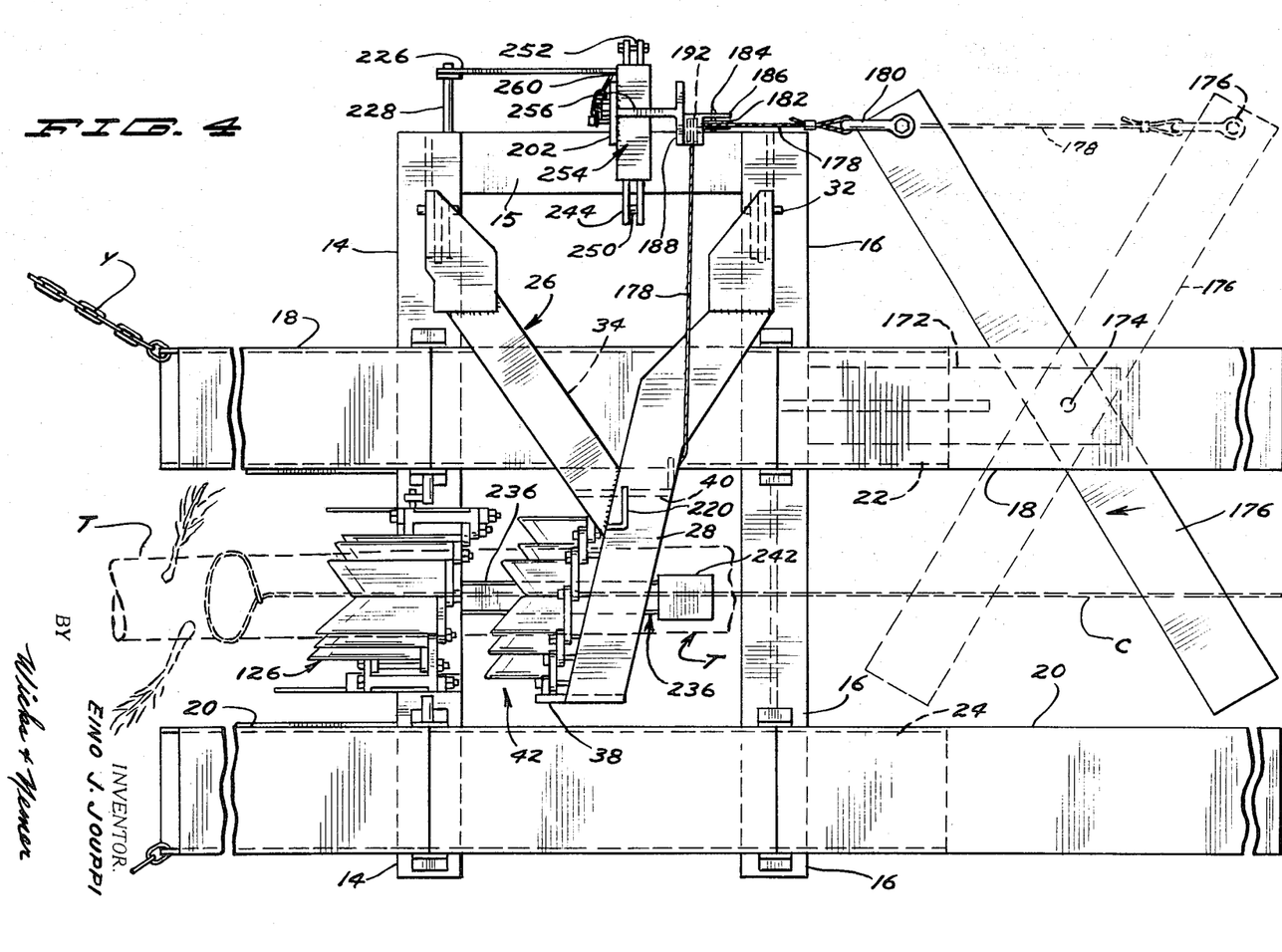
FIG. 4 is a top plan view of the device with the pivotal arm thereof in lowered position upon a tree shown in broken lines positioned with respect thereto for delimbing.
Figure 5:
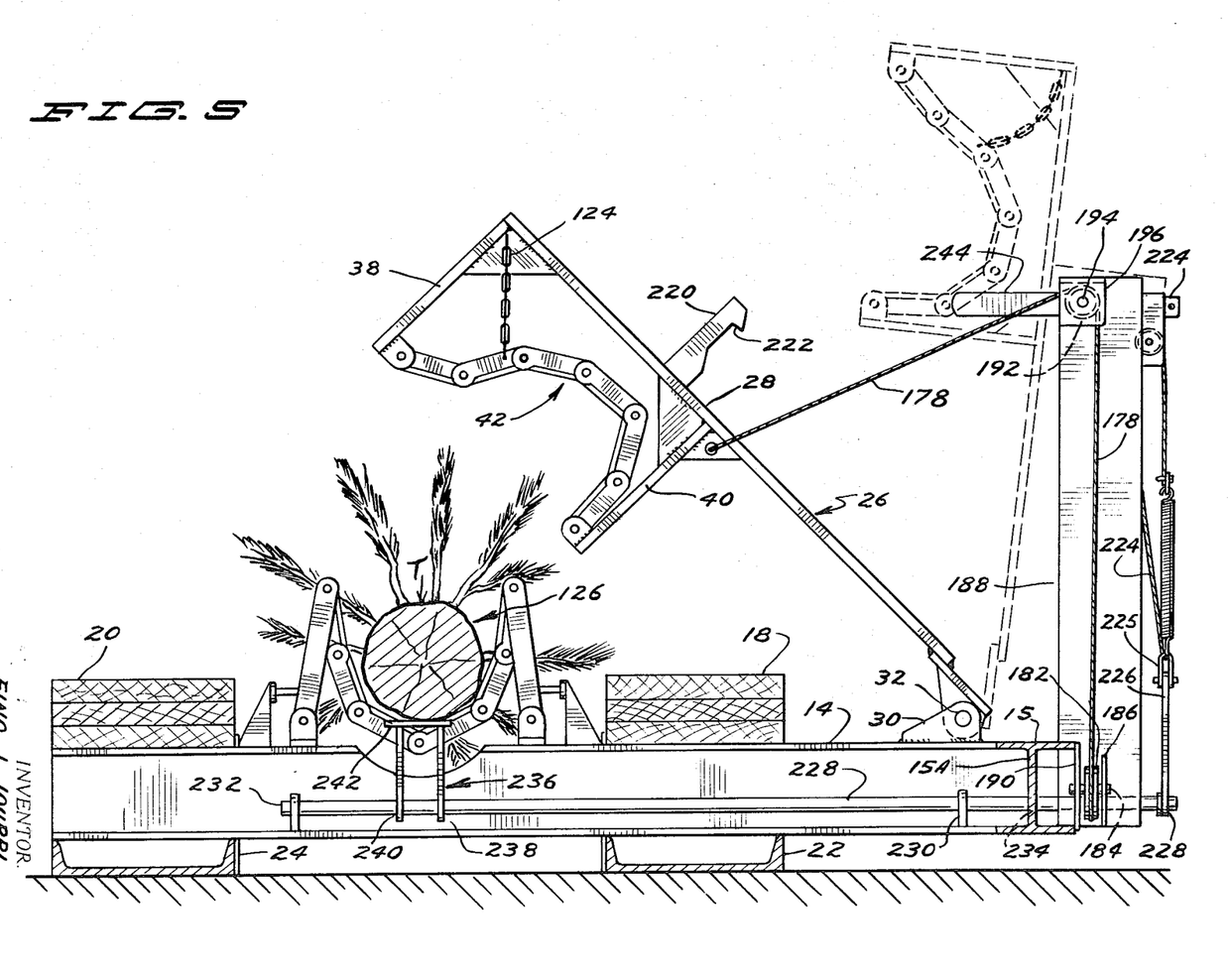
FIG. 5 is a view on the line 5—5 of FIG. 2 with the pivotal arm shown in full line in an intermediate position and a fully raised position in broken lines.

The cable 178 is also passed over the sheave 192 rotatably mounted on pin 194 which is mounted on right angle bracket 196 secured to mast 188. The outer end of the cable 178 is connected to the pivoted swing arm 26 as at "X." Thus when a moving force such as the forks F of the tractor T is brought against the bar 176 the bar is pivoted to the position shown in broken lines in FIG. 4 whereby the cable pulls upon and raises the pivotal arm 26 from a horizontal position to a substantially vertical position slightly over top dead center and against the top of the mast 188 where it remains at rest. The pivot 32 is positioned relatiVe to the mast 188 so that the frame rests against the mast in the slightly over top dead center as shown particularly in FIGS. 3 and 5.

LATCH AND TRIP MECHANISM FOR THE PIVOTAL FRAME

The numeral 200 designates a channel member secured at its outer free edges to the wall portion 202 of mast 188. The wall 204 of channel 200 is formed with the slot 206 extending throughout the length thereof. Slidably mounted in the channel 200 is the latch bar 208 which has the upper lug 210 connected thereto adjacent the upper end and the lower lug 212 connected thereto adjacent the lower end. Both lugs 210 and 212 extend through and outwardly of the slot 206. The latch bar 208 is urged in an upward direction by means of the coil spring 214 connected to the lug 212 and the pin 216 mounted on the wall 202 of mast 188. The upward movement of the latch bar 208 is limited by the stop 218 secured to the wall 204 of the channel 200 engaged by the upper lug 210. Further provided is the latch keeper 220 welded at its inner end to the first arm 28 of the pivotal frame 26 and extending outwardly therefrom and at right anGles thereto. The latch keeper has formed in the lower edge thereof the notch 222. The latch keeper 220 is so positioned that it overlies the upper end of the latch bar 208 when the pivotal swing arm 26 is against the mast 188, particularly FIG. 7. The length of the latch keeper 220 and the position of the latch bar 208 on the mast 188 is such that the notch 222 is spaced from the latch bar 208 when the pivotal swing frame 26 is in the upward at rest position as shown particularly in FIG. 7.

Figures 6, 7, 8, 9, 10:
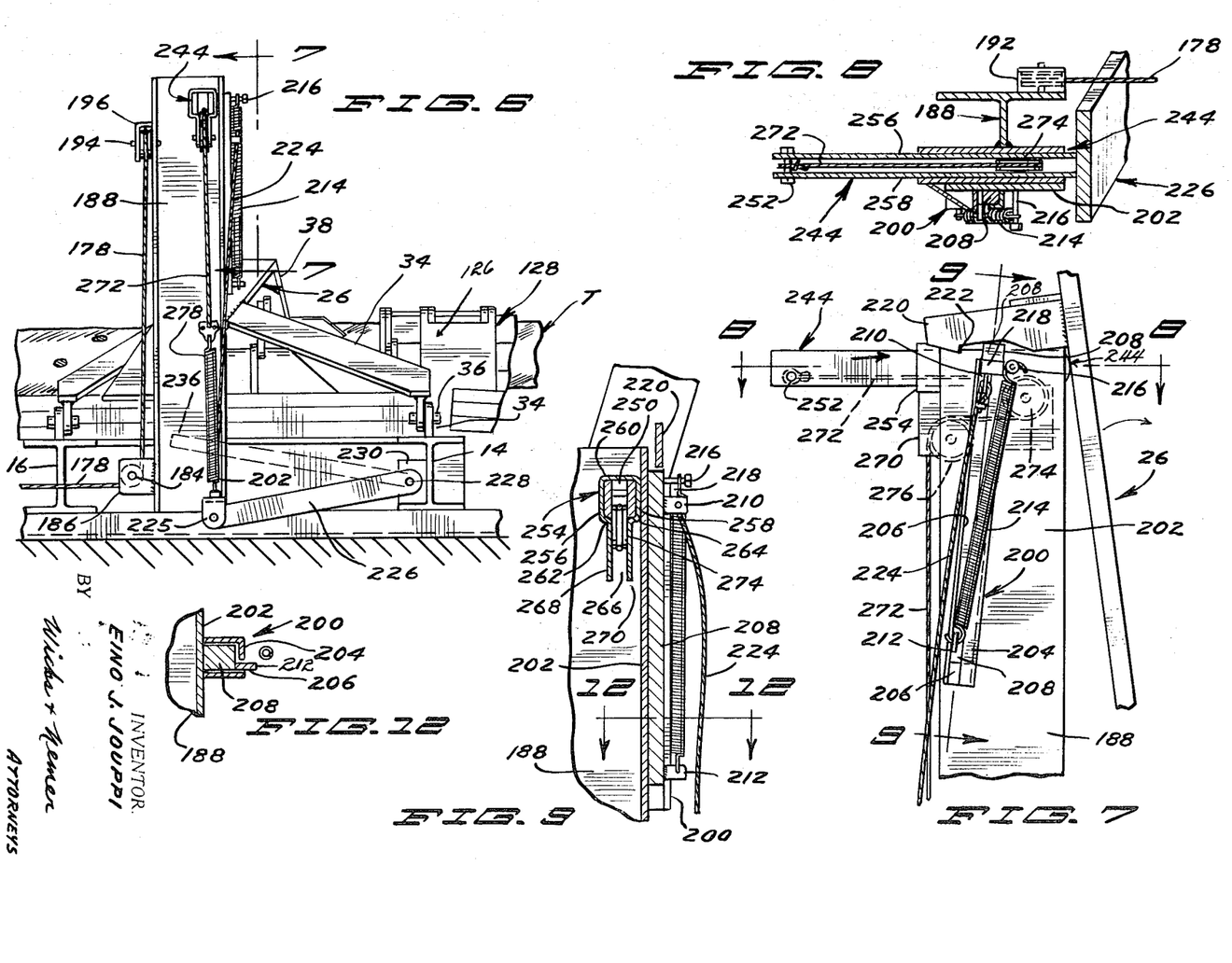
FIG. 6 is a side elevational of the device opposite to that of FIGS. 1 and 2 and with the pivotal arm in lowered position.
FIG. 7 is a view on the line 7—7 of FIG. 6.
FIG. 8 is a sectional view on the line 8—8 of FIG. 7.
FIG. 9 is a sectional view on the line 9—9 of FIG. 7.
FIG. 10 is a top plan view of the flexible blade cradle.
Figures 9, 10, 11:
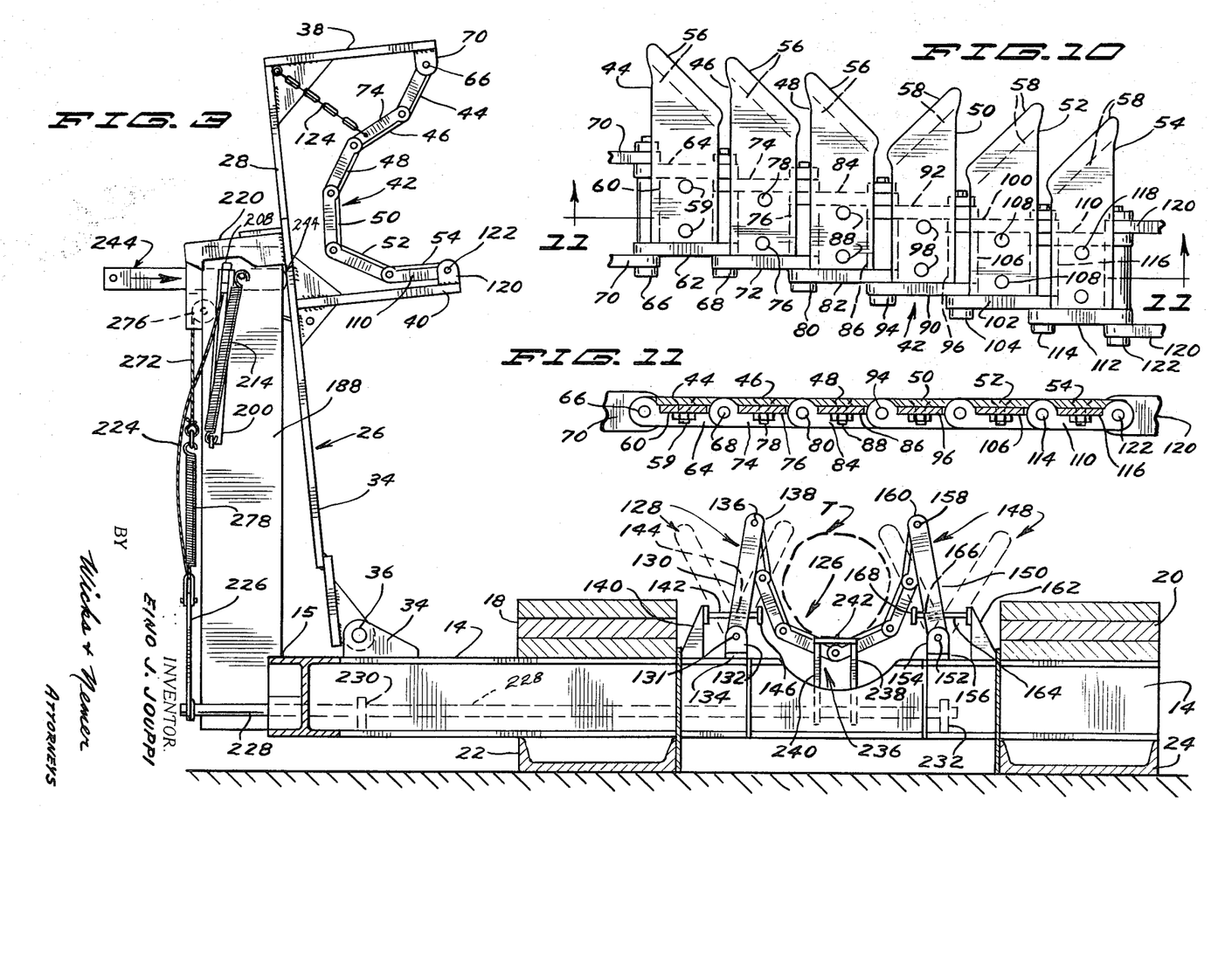
FIG. 11 is a sectional view on the line 11—11 of FIG. 10.

The numeral 224 designates a latch cable attached at its upper end to the lug 210 and at its lower end to the clevis 225 on the outer end of pivoted trip arm 226. The inner end of trip arm 226 is rigidly secured to the outer end of the transverse and horizontal rod 228 pivotally mounted in the lugs 230 and 232 secured to the transverse frame member 14. The rod 228 extends through the hole 234 formed in the wall portion 15a of frame member 15, particularly FIG. 5. Rigidly secured to the rod 228 at a point midway between lugs 132 and 154 supporting cradle supports 128 and 148, particularly FIG. 3, is the depressable trip arm 236 formed of the parallelly disposed elongated members 238 and 240. The outer ends of the members 238 and 240 are secured to the depresser plate 242 shown in raised position in FIGS. 1 and 2. The trip arm 236 is shown in depressed condition in FIG. 3, said plate having been depressed by the tree T. When the felled tree T is dragged to and upon the depresser plate 242 the same is pressed downwardly thereby rotating rod 228 which pivots arm 226 downwardly thereby pulling downwardly on latch cable 224 which pulls latch bar 208 downwardly from and free of latch keeper 220 thereby allowing latch keeper to move free of the latch bar and allow the arm 26 to pivot from the upright position of FIG. 7 to a horizontal position upon a tree. The tree is drawn in a position above the blade cradle by a winch on the tractor and then dropped upon the trigger plate 242. The initial movement of the arm 26 from its over dead center position as in FIG. 7 is caused by the following construction.

There is provided the pusher bar 244 composed of the two spaced elongated members 246 and 248 which are secured and held in spaced relation by the inner pin 250 and the outer pin 252. The pusher bar 244 is slidably mounted in the elongated horizontally disposed box 254, particularly FIGS. 4, 7, and 9. The box 254 is mounted in a hole formed in the wall portion 256 of mast 188 and welded to the wall 202 of the mast. The box 254 includes the side walls 256 and 258 joined by the top wall 260. The bottom of the box 254 is formed of two spaced narrow bottom wall portions 262 and 264 which form shoulders and a slot 266 therebetween, depending from the inner edges of the narrow bottom walls are the depending flanges 268 and 270, respectively.

The pusher bar 244 slides within the top 260 and upon the narrow portions 262 and 264 of the box 254. Secured to the outer pin 252 of pusher bar 244 is the cable 272 which extends through the box 254 and is passed over sheave 274 mounted on the inner portion of flanges 268 and 270 of box 254. The cable 272 is further extended over sheave 276 mounted on the outer portion of flanges 268 and 270 of box 254 with the cable 272 extending downwardly and connected to the coil spring 278 connected to the clevis 225 along with latch cable 224, particularly FIG. 6.

OPERATION OF THE DEVICE

Figure 1:
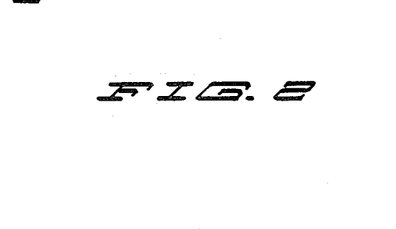
FIG. 1 is a side elevational view of a tree delimbing device embodying the invention with a tree positioned thereon for delimbing, the tree being drawn through the delimbing device by a tractor.
Figure 2:
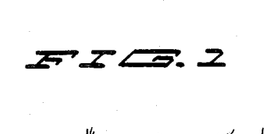
FIG. 2 is a side elevational view as in FIG. 1 with one track broken away to show detail.

Let it be assumed that the pivotal swing arm 26 is at rest in the substantially vertical over dead center inoperative position of FIGS. 1, 2, and 3. In this position the swing arm 26 is against the mast 188 and abutting the inner end of the pusher bar 244 as in FIGS. 1, 2, 3, and 7 in particular. The device A may be anchored by chain Y to a tree or other device to counteract the pulling force resulting from dragging a tree through the delimbing blades.

A cable C is attached to the large end of the felled tree T and the rear end of the tractor T with the large end elevated slightly so as to miss the lower blade cradle. The tractor is run up onto the frame track members 18 and 20 the tree being dragged behind. The tractor T proceeds along the tracks 18 and 20 from left to right as in FIG. 1 past the mast 188 so that the end of the tree is carried to and dropped upon the trip plate 242 on arm 266 and the tree is in the lower blade cradle 126. This action pivots arm 236 thereby rotating rod 228 which pivotally moves trip arm 226 downwardly thus pulling downwardly on latch cable 224 which pulls latch bar 208 downwardly, particularly FIGS. 6 and 9 for release of the latch keeper as it passes over the latch bar.

Substantially simultaneously the pivotal downward movement of the trip bar 226 the pusher bar 244 is pulled inwardly of the mast 188 and against the arm 28 of swing arm 26 thereby pushing it from its over dead center at rest position so that falls to a position with the upper blade cradle upon the tree. In this position the tree is encompassed and engaged by both upper and lower blade cradles 42 and 126, respectively. The tractor T then proceeds and drags the tree through the delimbing cradle blades until the entire tree has been delimbed. The delimbed branches are deposited as a result of cutting in the area between the tracks 18 and 20 and to the left of cradle 126 looking at FIG. 1. The delimbed tree is then dragged free of the unit A. The tractor then approaches the device A from the right looking at FIG. 1 and onto the tracks with the fork F forced against the inner end of the bar 176 thereby pivoting the bar. With the pivoting of the bar 176 the outer end draws upon the cable 178 thereby raising the swing arm 26 upwardly and to the over dead center at rest position as shown particularly in FIGS. 3 and 7. The tractor can then keep going on the tracks 20 and 22 and past the lower blade cradle 42 and with the fork F the delimbed branches referred to can be easily and quickly pushed from the area referred to.

It will be noted that if the trip arm 236 is not pivotally depressed either by a tree as described or by hand, the mast cannot be pushed from its vertical at rest position as in FIG. 7, for if it is pushed, the latch keeper 220 will engage the upper end of the latch bar 20. It is only when the trip bar 226 is depressed that the latch bar 208 will be withdrawn so that the latch keeper will bypass it and thereby let the mast 188 swing to a downward position. This provides a very desirable safety factor.

Figure 13:
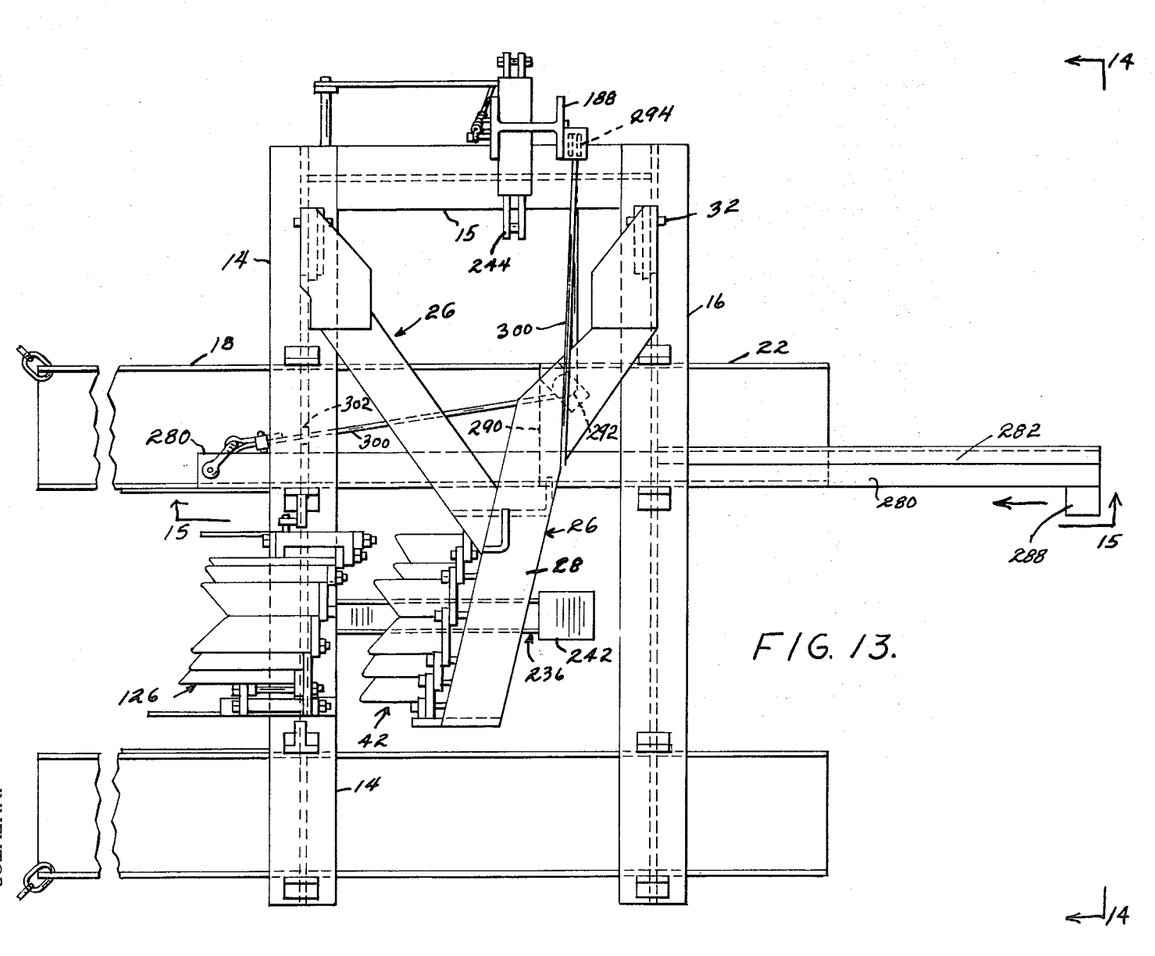
FIG. 13 is a top plan view similar to FIG. 4 of a further embodiment of the invention portions thereof being broken away and the tracks removed.
Figures 14, 15:
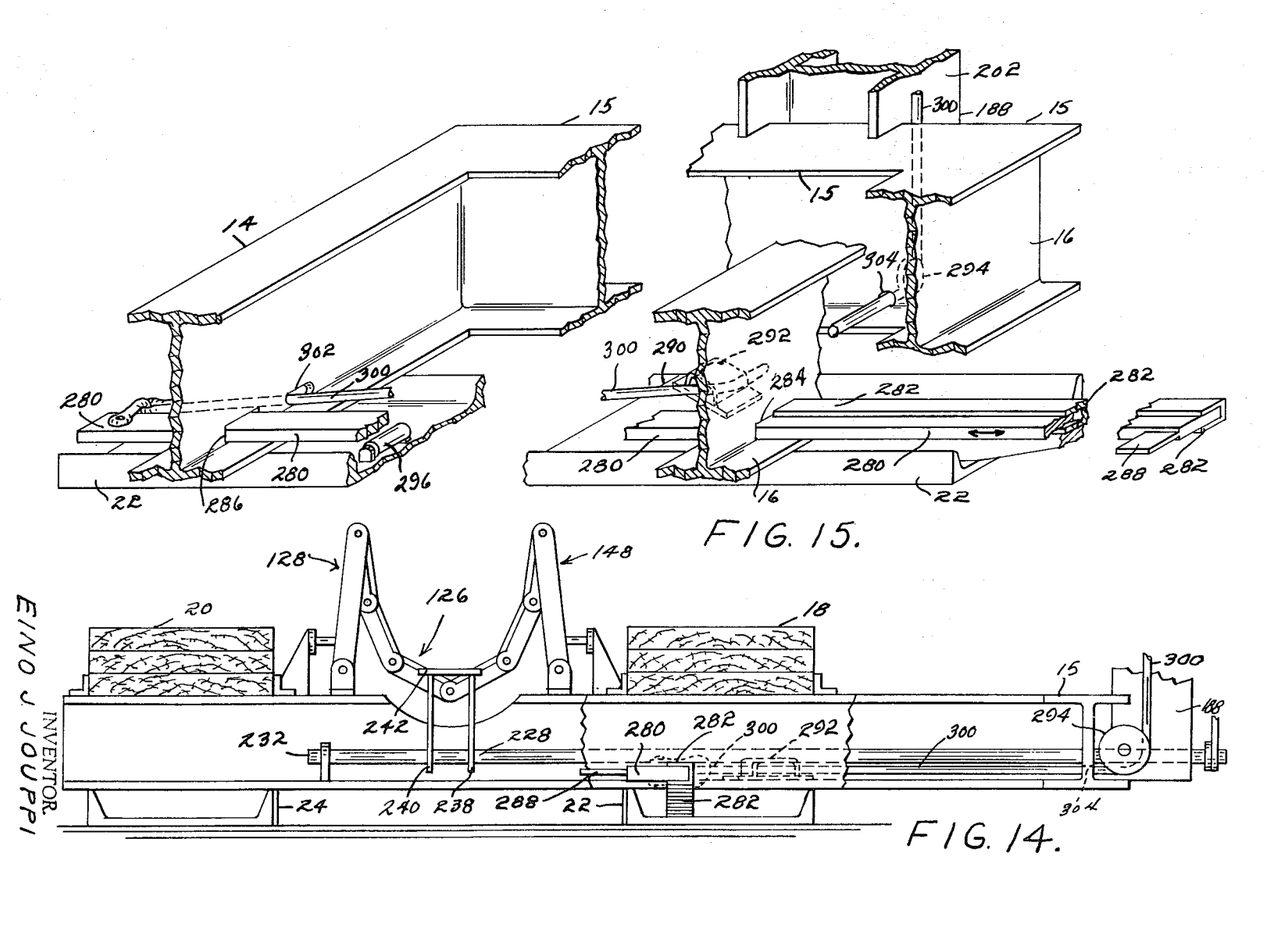
FIG. 14 is a view substantially on the line 14—14 of FIG. 13.
FIG. 15 is a perspective view substantially on the line 15—15 of FIG. 13 with a channel member broken away and portions broken away.

A further embodiment of means for raising the mast 188 is illustrated in FIGS. 13, 14 and 15. Included is the elongated rigid slide bar 280 which is slidably mounted in the channel 282, the channel 282 secured at its inner end to the frame member 16 and upon the channel 22. The bar 280 extends through a slot 284 formed in the frame member 16 and a slot 286 formed in the frame member 14. On the other end of the bar 28 is the lug 288 used in actuating the bar as hereinafter described.

Further provided is the plate bracket 290 secured to the frame member 16 and mounted on the plate bracket 290 is the sheave 292. The numeral 294 designates a sheave mounted on the mast 188. The bar 280 slides upon the roller 296 mounted on the channel member 22 and the roller 298 also mounted on the channel 22. Secured to the end of the bar 280 is the cable 300 which extends through the hole 302 of the frame member 14. The cable 300 is placed on the sheave 292 and thence through the hole 304 in the frame member 15 where it is passed over the sheave 294 and upwardly to and over the sheave 192 as in FIGS. 4 and 5. The outer end of the cable 300 extends from the sheave 192 and is secured at its end to the pivoted arm 26 as in FIGS. 4 and 5. Thus with the construction of FIGS. 13, 14 and 15 the swing arm 26 is raised by engaging the fork F of the tractor T against the lug 288 and pushing the bar in the direction of the arrow in FIGS. 13 and 15. As a result the cable 300 pulls the arm 26 upwardly to the position of FIGS. 2 and 3. The arm 26 is brought to a lowermost position by actuation of the trip member 242 as hereinbefore described.

I claim:
1. A device for delimbing a felled tree comprising:
   a. an elongated frame having
   b. spaced longitudinal frame members along which the felled tree travels,
   c. transverse frame means attached to said longitudinal frame members,
   d. lower trunk-engaging means extending transversely of said longitudinal frame members and serving as a support for the trunk of the tree,
   e. cutting means carried by said lower trunk-engaging means and cutting off the limbs on the lower part of the trunk of the tree as the tree is advanced along said longitudinal frame members,
   f. a mast extending upwardly from said transverse frame means and disposed outwardly from one of said elongated frame members,
   g. an arm extending outwardly from said transverse frame means,
   h. pivot means acting between said transverse frame means and the inner end of said arm,
   i. upper trunk-engaging means mounted on the outer end of said arm and engageable with the upper portion of the trunk of the tree,
   j. cutting means carried by said upper trunk-engaging means for cutting off the limbs on the upper part of the tree as the tree is advanced between the longitudinal frame members, and
   h. power actuated means for drawing the tree along said frame members.
2. The device of claim 1 in which
   a. the lower trunk-engaging means is articulate and conforms to the cross sectional configuration of the tree trunk and
   b. the upper trunk-engaging means is similarly constructed.
3. The device of claim 1 in which
   a. the lower trunk-engaging means is in the form of a cradle having links and
   b. the cutting means cooperating therewith consists of individual blades attached to certain of said links.
4. The device of claim 3 in which
   a. the end links are pivoted to posts and which
   b. are pivoted to the upper ends of posts disposed on opposite sides of the trunk of the tree being delimbed and which
   c. are pivoted at their lower ends to said frame,
   d. said posts upon downward pressure on said lower engaging means by the weight of the tree trunk, swinging inwardly and causing the blades to engage the tree trunk at least for the lower half of the circumference of the trunk through out its extent.
5. The device of claim 3 in which
   a. the blades on the lower trunk-engaging means are all of the same size and shape and
   b. the links of the engaging means are progressively offset in the same direction to cause the same to successively cut limbs from a tree at different times.
6. The device of claim 3 in which
   a. the upper trunk-engaging member and the cutting means is similarly constructed to the lower trunk-engaging member and cutting means.
7. The device of claim 1 in which a. the pivot means between the transverse frame means and the inner end of the arm is sufficiently spaced from the mast so that the upper end of the arm may pass dead center when moved upwardly and outwardly.

8. The device of claim 1 in which
a. the power actuated means comprises a tractor, and
b. the longitudinal frame members have tracks along which the wheels of the tractor may ride.

9. The device of claim 8 in which
a. the arm is raised by means of a cable connected at one end to
b. a lever picoted intermediate its ends to one of said longitudinal frame members and connected to said arm,
c. said cable passing over a pulley secured to said mast at its upper end and
d. over another pulley secured to said transverse frame means.

10. The device of claim 9 in which
a. the tractor has means for engaging the lever at the end opposite to that to which the cable is attached for swinging the lever to raise the arm.

11. The device of claim 10 in which
a. latch means is employed acting between said arm and mast and
b. release means is used in conjunction with said latch means to render the same inactive.

12. The device of claim 11 in which
a. the latching means includes a latch secured to said arm and having
b. an abutment formed thereon,
c. a keeper mounted for movement toward and from the abutment,
d. resilient means for urging the keeper into engagement with the abutment,
e. a trigger guided for downward movement and engageable with an oncoming log for withdrawing said keeper from said latch to free the arm for downward swinging movement.

13. The device of claim 12 in which
a. pusher means employed for pushing the arm back over dead center,
b. said pusher means being operated by said trigger.

14. The device of claim 1 in which
a. the arm is raised by means of a cable connected at one end to
b. a lever pivoted intermediate its ends to one of said longitudinal frame members and connected to said arm,
c. said cable passing over a pulley secured to said mast at its upper end and
d. over another pulley secured to said transverse frame means.

15. The device of claim 1 in which
a. latch means is employed acting between said arm and mast and
b. release means is used in conjunction with said latch means to render the same inactive.

16. The device of claim 15 in which
a. the latching means includes a latch secured to said arm and having
b. an abutment formed thereon,
c. a keeper mounted for movement toward and from the abutment,
d. resilient means for urginng the keeper into engagement with the abutment,
e. a trigger guided for downward movement and engageable with an oncoming log for withdrawing said keeper from said latch to free the arm for downward swinging movement.

17. The device of claim 6 in which
a. each of said blades of each of said cutting means is formed with an oblique cutting edge and one or more of the oblique cutting edges of the blades of each cutting means is oppositely disposed to the oblique cutting edges of the remaining blades thereof.

18. The device of claim 1 in which the arm is raised by
a. elongated means
b. means slidably mounting said elongated means on said elongated frame,
c. flexible means connected to said elongated means and said pivoted arm, and
d. means for actuating said elongated means to raise said arm through said flexible means.

19. The device of claim 18 in which said means for slidably mounting said elongated means includes a channel member in which said elongated means is mounted.

20. The device of claim 19 in which
a. said flexible means is a cable.

21. The device of claim 20 in which
a. said cable is passed over a sheave carried by said elongated frame, and
b. passed over a sheave carried by said mast.

22. The device of claim 18 in which said elongated means is a rigid rod.

23. The device of claim 19 in which said elongated means is a rigid rod.

* * * * *